Patented July 11, 1950

2,515,123

UNITED STATES PATENT OFFICE 2,515,123

ACYLATION OF FURAN

Howard D. Hartough, Pitman, N. J., assignor to Socony-Vacuum Oil Company, Incorporated, a corporation of New York No Drawing. Application October 3, 1947, Serial No. 777,853

10 Claims. (Cl. 260—345)

This invention relates to a process for the acylation of furan and, more particularly, is directed to a catalytic method for acylating furan and its derivatives in the presence of a small amount of boron trifluoride.

Acylation reactions are well known in the art and connote the union between acyl radicals and molecules of organic compounds under conditions of temperature, pressure, and time ordinarily referred to in the art as acylating conditions. The compounds thus produced represent structurally the substitution of the original acyl radical for a hydrogen atom on the organic compound molecule.

As a general rule, the temperature, pressure, and time of reaction employed in acylation operations depend upon whether the acylation is effected in the absence or presence of catalysts. The two methods are generally referred to as thermal and catalytic acylation, respectively. The majority of acylation processes fall under the latter category and it is a catalytic acylation process with which the present invention is concerned.

Acyl radicals may be furnished in acylation reactions by various materials commonly referred to as acylating agents. Thus, the anhydrides of carboxylic acids and acyl halides have served as sources of the acyl radical. In particular, acetic anhydride and acetyl chloride have found wide application as acylating agents.

The acylation of furan and furan derivatives have previously been carried out employing one of the above mentioned acylating agents in the presence of various catalysts, including stannic chloride, ferric chloride, aluminum chloride, and titanium tetrachloride.

These catalysts, although applicable with considerable success in the acylation of aromatic hydrocarbons, are only moderately successful where furan is involved. It has been postulated that this may be accounted for by the fact that compounds such as aluminum chloride form addition complexes with the carbonyl group of the resulting ketone, substantially decreasing the yield of desired product and requiring a considerable excess of aluminum chloride over the theoretical amount required for the acylation reaction. Thus, when aluminum chloride is used as the condensing agent, the ratio of catalyst to acyl chloride is at least one and in the case of acid anhydrides, at least two. Likewise, other of the above mentioned catalysts of the Friedel-Crafts type must be used in molecular quantities with respect to the acyl halide being employed in the acylation of furan. This is probably due to the fact that acyl halides form comparatively stable molecular complexes with aluminum chloride and the other above mentioned catalysts, thereby decreasing their catalytic effect.

While yields as high as 50 per cent of theory have been reported using an aluminum chloride catalyst, these figures have been the exception rather than the rule. In general, the yields of acyl furans heretofore obtained have averaged about 35 per cent of theory. These relatively small yields were believed to be due, at least in part, to the relatively large quantities of catalyst being employed, i. e., amounts of the order of molecular quantities with respect to reactants being used. Attempts were accordingly made to overcome the existing difficulties by the use of traces or catalytic amounts of aluminum chloride. Minute amounts of this compound, however, failed to catalytically produce any of the desired furyl ketone.

It has now been discovered that boron trifluoride and complexes thereof which release boron trifluoride under the acylation conditions behave in a distinctive manner as compared with the other Friedel-Crafts catalyst heretofore used in the acylation of furan. It has been found that by using a boron trifluoride catalyst, the above mentioned difficulties encountered in the acylation of furan have largely been overcome. It would appear that the advantages obtained using a boron trifluoride catalyst can be attributed to the fact that relatively small quantities, i. e., less than one mole per mole of acylating agent can be used as effective catalyst in the acylation of furan and its derivatives. By employing a boron trifluoride catalyst in catalytic amounts, the formation of addition complexes formerly encountered in the catalytic acylation of furan has been substantially eliminated, the products resulting being almost entirely acyl furans having one or more side chains corresponding to that of the acylating agent. It has been found, in accordance with this invention, that boron trifluorides employed in quantities less than one mole per mole of acylating agent used effect the acylation of furan smoothly and specifically in contrast with the more conventional acylation Friedel-Crafts type catalysts heretofore employed.

It is accordingly an object of the present invention to provide an efficient process for synthesizing acylated furans. Another object is to provide a process for catalytically acylating furan and its derivatives. A still further object is to afford a process for catalytically acylating furan in a direct manner which can be easily carried out using a relatively inexpensive catalyst in small amounts. A very important object is to provide a process capable of reacting furan or its derivatives with an acylating agent in the presence of an efficient catalyst to give a yield of acylated furan substantially greater than that heretofore obtained.

These and other objects which will be recognized by those skilled in the art are attained in accordance with the present invention, wherein furan or its derivatives are acylated by reaction with organic carboxylic acid anhydrides or acyl halides in the presence of a small amount of boron trifluoride.

Boron trifluoride conveniently forms complexes with various organic compounds such as ethers, thioethers, alcohols, carboxylic acids, ketones, amines, carboxylic acid anhydrides, and carboxylic esters. These complexes are easily formed by saturating the solutions thereof with gaseous boron trifluoride in a closed pressure vessel. For example, glacial acetic acid, when saturated with boron trifluoride, under pressure forms the compound $CH_3COOH \cdot BF_3$ containing 51.9 per cent $BF_3$. Similarly, methanol, when saturated with boron trifluoride, under pressure forms a boron trifluoride-methanol complex containing 60 per cent boron trifluoride. Thus, the present invention contemplates, in addition to boron trifluoride itself, the use of boron trifluoride as a catalyst in the form of an organic complex which allows the gaseous boron trifluoride to be conveniently weighed and handled. Representative of the boron trifluoride complexes contemplated for use in the present process, are those with ethyl alcohol, methyl alcohol, formaldehyde, acetone, propionic anhydride, and ethyl acetate. This group, of course, is not to be considered as limiting since other similar organic boron trifluoride complexes which will yield $BF_3$ under the conditions hereinafter set forth may likewise be employed as catalysts in promoting the acylation of furan. While the present invention is not to be strictly limited to any specific small amount of catalyst, it has been found that boron trifluoride present in amounts less than one mole per mole of acylating agent is an effective catalytic agent in promoting the acylation of furan. In general, it has been preferable to use an amount of boron trifluoride between about 0.001 and about 0.1 mole per mole of acylating agent.

While, in some respects, the chemical behavior of furan is similar to that of benzene, there are some very striking differences. This is illustrated by the fact that the acylating catalysts ordinarily used for the acylation of benzene are not suitable for the acylation of furan. Moreover, catalysts which readily effect the acylation of furan will not always effect the acylation of benzene. This is particularly true in the present invention. The small quantities of boron trifluoride which permit the acylation of furan to proceed smoothly and efficiently are inactive in the acylation of benzene. As those in the art know, boron trifluoride has previously been employed as a catalyst in the acylation of benzene. In all of these reactions heretofore carried out, however, it has been necessary to use relatively large quantities of catalyst to effect condensation, i. e., amounts equal to or greater than one mole of catalyst per mole of acylating agent used. The small quantities of boron trifluoride, under the conditions herein employed in the acylation of furan, fail to catalyze the acylation of benzene. Thus, a small amount of boron trifluoride which is inactive catalytically in the acylation of benzene is, in accordance with the present invention, a preferred catalyst for the acylation of furan.

The acylating agents to be used herein may be an organic carboxylic acid anhydride or an acyl halide. Included in the former category are compounds such as the ketenes which, upon addition of water, yield organic carboxylic acids. These acylating agents may be derived by methods well known to the art from mono- or dibasic organic acids which may be either unsaturated or saturated. Thus, representative acylating agents to be used in this invention include the anhydrides of saturated fatty acids, such as acetic anhydride, propionic anhydride, ketene, etc.; the acyl halides of saturated fatty acids, such as acetyl chloride, stearyl chloride, etc.; the acyl halides of dibasic acids, such as phthalyl chloride; the anhydrides of saturated acids, such as crotonic anhydride; and the acyl halides of unsaturated acids, such as crotonyl chloride. These acylating agents are given merely by way of examples and are not to be construed as limiting since other acyl halides or anhydrides of carboxylic acids, which will readily suggest themselves to those skilled in the art, may likewise be used. In general, carboxylic acid anhydrides are to be preferred as the acylating agents in the present process, since greater yields of the desired ketone were obtained when these were usd.

The acylation of furan may be carried out employing equimolar quantities of furan and acylating agent. However, the presence of an excess of one of these reactants has been found to give an increased yield of the desired product. Thus, an excess of either acylating agent or furan gave an increased amount of ketone as compared with those reactions in which equimolar quantities were used.

The temperature at which the reaction is carried out may vary over a wide extent, the upper limit of temperature being dependent on the boiling point of the reactants at the specific pressure of the reaction. In general, temperatures varying between about $-30°$ C. and about $150°$ C. have been found satisfactory for effecting the acylation. However, generally it is preferred to employ temperatures in the range of from about $0°$ C. to about $50°$ C. Pressures between about one and about 10 atmospheres have been found satisfactory in the acylation process. The effect of increased pressure, theoretically, is toward increased reaction but from a practical standpoint, this is not a very great effect with reactions such as those involved herein, which go readily at normal pressures. The reaction period necessary will be dependent largely upon the temperature employed, in general being less at the higher temperature. Under the conditions set forth above, however, the reaction time will generally vary from about 1 to about 10 hours.

The following detailed examples are for the purpose of illustrating modes of effecting the acylation of furan in accordance with the process of this invention. It is to be clearly understood that the invention is not to be construed as limited to the specific acylating agents used or to the specific conditions set forth in the examples.

*Example I*

To a mixture of 204 grams (3 moles) of furan and 107 grams (1 mole) of 95 per cent acetic anhydride, cooled to 10° C. by means of an ice bath, were added 4 grams of boron trifluoride-methanol complex containing 60 per cent boron trifluoride, equivalent to 0.03 mole of boron trifluoride. The temperature rose to about 13° C. and when it finally subsided to 5° C., the ice bath was removed and the reaction mixture warmed to 25° C. for a period of 2 hours. Two hundred milliliters of water were then added. The mixture was agitated for 15 minutes and the lower organic layer drawn off and washed with 10 per cent sodium carbonate solution until neutral and distilled. Fifty-three grams of 2-acetylfuran, representing a yield of 48 per cent of theory, were obtained.

*Example II*

To two hundred four grams (3 moles) of furan were added 71 grams (0.5 mole) of benzoyl chloride and 4 grams of boron trifluoride-ethyl etherate containing 51 per cent boron trifluoride. The mixture turned dark but no evolution of hydrogen chloride could be detected at ambient temperatures. The mixture was then refluxed at 38° C. for 2 hours, during which time evolution of hydrogen chloride could be detected. Considerable amounts of insoluble material formed during this period. The organic layer was decanted from the sludge into cracked ice. One mole of sodium hydroxide as a 10 per cent solution was added and the mixture allowed to stand until all odor of benzoyl chloride had disappeared and the furan evaporated off. The semicrystalline mass was filtered off and digested with alcohol. Evaporation of the alcohol gave 8.5 grams of crude crystalline 2-benzoylfuran.

*Example III*

To two hundred four grams (3 moles) of furan were added 100 grams (0.44 mole) of benzoic anhydride. The mixture was cooled to 7° C. and 3 grams of boron trifluoride-acetic acid complex, equivalent to approximately 0.025 mole of boron trifluoride, were added. The mixture was allowed to warm to 32° C. (room temperature) and was stirred at this temperature for two hours. It was then cooled to 8° C., 400 grams of 10 per cent sodium hydroxide solution were added, and the mixture was stirred for 30 minutes longer. The organic layer was separated off and washed once with water, and the excess furan recovered by distillation. Sixty-six grams of semi-solid residue were distilled to produce pure 2-benzoylfuran, having a boiling point of 126° C. at 0.5 millimeters of mercury and a melting point of 43.5–44° C. after recrystallization from alcohol.

From the above examples, it will be seen that small amounts of boron trifluoride are effective catalysts for the acylation of furan. Likewise, furan derivatives having one or more substituent groups attached to the furan ring may be acylated in accordance with this invention. The acylated furans as produced in accordance with the process described herein have found a variety of uses and may be employed as solvents, addition agents for petroleum fractions, plasticizers, resin intermediates and intermediates for chemical synthesis. Long chain alkyl furyl ketones may be utilized as synthetic lubricants, dielectrics, waxes, and extreme pressure additives for mineral oils.

I claim:

1. A process for acylating furan, comprising reacting the same with an acylating agent selected from the group consisting of acyl halides and anhydrides of carboxylic acids in the presence of an amount of a boron trifluoride-organic complex equivalent to less than one mole of boron trifluoride per mole of acylating agent.

2. A process for acylating furan, comprising reacting the same with an acylating agent selected from the group consisting of acyl halides and anhydrides of carboxylic acids in the presence of an amount of boron trifluoride-etherate complex equivalent to less than one mole of boron trifluoride per mole of acylating agent.

3. A process for acylating furan, comprising reacting the same with an acylating agent selected from the group consisting of acyl halides and anhydrides of carboxylic acids in the presence of an amount of boron trifluoride-fatty acid complex equivalent to less than one mole of boron trifluoride per mole of acylating agent.

4. A process for acylating furan, comprising reacting the same with an acylating agent selected from the group consisting of acyl halides and anhydrides of carboxylic acids in the presence of an amount of boron trifluoride-aliphatic alcohol complex equivalent to less than one mole of boron trifluoride per mole of acylating agent.

5. A process for acylating furan, comprising reacting the same with an acylating agent selected from the group consisting of acyl halides and anhydrides of carboxylic acids in the presence of an amount of boron trifluoride-ethyl etherate complex equivalent to less than one mole of boron trifluoride per mole of acylating agent.

6. A process for acylating furan, comprising reacting the same with an acylating agent selected from the group consisting of acyl halides and anhydrides of carboxylic acids in the presence of an amount of boron trifluoride-acetic acid complex equivalent to less than one mole of boron trifluoride per mole of acylating agent.

7. A process for acylating furan, comprising reacting the same with an acylating agent selected from the group consisting of acyl halides and anhydrides of carboxylic acids in the presence of an amount of boron trifluoride-methanol complex equivalet to less than one mole of boron trifluoride per mole of acylating agent.

8. A process for acylating furan, comprising reacting the same with an acylating agent selected from the group consisting of acyl halides and anhydrides of carboxylic acids in the presence of an amount of a boron trifluoride-organic complex equivalent to between about 0.001 and about 0.1 mole of boron trifluoride per mole of acylating agent.

9. A process for acylating furan with an acylating agent selected from the group consisting of acyl halides and anhydrides of carboxylic acids in the presence of an amount of a boron trifluoride-organic complex equivalent to between about 0.001 and 0.1 mole of boron trifluoride per mole of acylating agent, comprising the steps of mixing furan, acylating agent, and boron trifluoride-organic complex, reacting the mixture at a temperature of between about −30° C. and about 150° C. until the reaction is substantially complete, and thereafter removing acylated furan from the reaction product mixture.

10. A process for acylating furan with an acylating agent selected from the group consisting of acyl halides and anhydrides of carboxylic acids in the presence of an amount of a boron trifluoride-organic complex equivalent to between about 0.001 and about 0.1 mole of boron trifluoride per mole of acylating agent, comprising the steps of mixing furan, acylating agent, and boron trifluoride-organic complex, reacting the mixture at a temperature of between about 0° C. and about 50° C. until the reaction is substantially complete, and thereafter removing acylated furan from the reaction product mixture.

HOWARD D. HARTOUGH.

REFERENCES CITED

The following references are of record in the file of this patent:

UNITED STATES PATENTS

| Number | Name | Date |
|---|---|---|
| 2,004,069 | Bruson | June 4, 1935 |
| 2,158,031 | Loder | May 9, 1939 |

OTHER REFERENCES

Groggins, Unit Processes in Organic Synthesis, 2nd edition (1938), McGraw-Hill Book Co., New York, pp. 657–658.

Groggins, Unit Process in Organic Chemistry, pages 634 to 637, 2nd ed. (1938), McGraw-Hill Book Co. Inc., N. Y.

Calloway, "Chemical Reviews," vol. 17, pages 330, 360–362, 374–377, 371 (Aug.-Dec. 1935).